United States Patent
Seiferth et al.

(10) Patent No.: US 8,642,518 B2
(45) Date of Patent: Feb. 4, 2014

(54) RECOVERY OF LUBRICANTS FROM USED COOLING LUBRICANTS

(75) Inventors: Oliver Seiferth, Köln-Zündorf (DE); Gerhard Kudermann, Alfter (DE)

(73) Assignee: Hydro Aluminum Rolled Products GmbH, Grevenbroich (DE)

( * ) Notice: Subject to any disclaimer, the term of this patent is extended or adjusted under 35 U.S.C. 154(b) by 228 days.

(21) Appl. No.: 13/131,352

(22) PCT Filed: Nov. 4, 2009

(86) PCT No.: PCT/EP2009/064628
§ 371 (c)(1),
(2), (4) Date: May 26, 2011

(87) PCT Pub. No.: WO2010/060765
PCT Pub. Date: Jun. 3, 2010

(65) Prior Publication Data
US 2011/0230377 A1    Sep. 22, 2011

(30) Foreign Application Priority Data
Nov. 27, 2008  (DE) .......................... 10 2008 059 439

(51) Int. Cl.
C10M 169/04  (2006.01)
C10M 175/00  (2006.01)
B21B 45/02    (2006.01)

(52) U.S. Cl.
USPC ................ 508/111; 508/110; 72/41; 208/184

(58) Field of Classification Search
USPC .......................... 508/110, 111; 72/41; 208/184
See application file for complete search history.

(56) References Cited

U.S. PATENT DOCUMENTS 4,333,822 A * 6/1982 Tkac et al. ..................... 208/184
2007/0199359 A1 * 8/2007 Rajagopalan et al. ............. 72/42

FOREIGN PATENT DOCUMENTS

DE    3042094 A1    5/1981
DE    3224235 A1    12/1983

* cited by examiner

*Primary Examiner* — Prem C Singh
*Assistant Examiner* — Francis C Campanell
(74) *Attorney, Agent, or Firm* — Honigman Miller Schwartz and Cohn LLP; Thomas A. Wootton; Jonathan P. O'Brien

(57) ABSTRACT

In a method for recovering lubricant or lubricant concentrate from a used mixture containing lubricant, the mixture containing lubricant and which is substantially dewatered is subjected to short path distillation at a temperature of at least 150° C. and a pressure of less than 1.5 mbar, in order to obtain a lubricant concentrate which can be recycled into cooling lubricants and which is free of very finely wear debris, metal soaps and polymers.

8 Claims, No Drawings

RECOVERY OF LUBRICANTS FROM USED COOLING LUBRICANTS

This application is the U.S. National phase of PCT Application No. PCT/EP2009/064628, filed Nov. 9, 2009, which claims the priority of German Patent Application No. 102008059539.3, filed Nov. 27, 2008, both of which are incorporated herein by reference in their entirety.

TECHNICAL FIELD

The invention relates to the recovery of lubricants and lubricant concentrates from used, water-immiscible, water-miscible or water-mixed cooling lubricants, such as metal working fluids used in cutting and non-cutting metal working.

BACKGROUND TO THE INVENTION

In metal working, used lubricants and lubricant sludge accumulate which regularly have to be disposed of as waste. Used emulsions and water-containing lubricant sludge have to be separated into water, lubricant components and impurities at relatively high cost and conveyed for further disposal. In the particular case of lubricants and lubricant sludge, the waste contains valuable active substances. At the same time, in addition to the disposal costs, the prices for the charge materials, i.e. for mineral oils and additives, progressively increase. For this reason, methods for reprocessing oil-water mixtures for thermally recycling the oil concentrates and treating the weakly oil-containing water in biological clarification plants or recovering the water via reverse osmosis plants for producing emulsion or for other purposes become commercially interesting. An even greater commercial advantage is obtained if the purified oil concentrate can be returned to the lubricant cycle.

Evaporation, membrane filtration and the separator, decanter or tricanter techniques have, for example, been described for dewatering oil sludge. Eisenmann Maschinenbau GmbH & Co. KG thus provides a plant, in which firstly oil-containing residue is mechanically dewatered in a tricanter, then the oil phase is treated for use as fuel or for other purposes, the solid phase is burnt and the water phase is subjected to ultra-filtration.

Metal soaps, wear debris and other components, which contribute to a highly viscous residue or periodically to a highly viscous state during dewatering, lead to processing problems which are difficult to control. Very fine wear debris can barely, if at all, be separated from lubricating oil using gravity due to the small differences in density and particularly in the presence of surface-active substances (surfactants) and viscous medium.

In evaporator plants, the partly highly viscous consistency of the oils, which often reaches a maximum with dewatering, leads to adhesion and impeded evaporation of the water. With the methods described up to now, metal soaps which form in the emulsion cannot be removed from the oil. Attempts to remove the metal soaps with flocculation agents have been described in the literature.

Recovery of the additive-containing oil concentrate or lubricant concentrate by distillation, in which the unwanted metal soaps and tramp oil proportions remain in the residue, has not been described up to now and due to the high-boiling and partly thermally sensitive components was up to now considered impossible to perform.

High viscosity and impurities lead to deposits during batch distillation which hinder heat transfer and require a high level of maintenance.

With regard to dewatering the oil-water mixture and recovering the water by distillation in evaporator plants, it is to be noted, due to the relatively high evaporation energy of the water, that here energy recovery using compression condensation has proved advantageous. The low pressures of about 0.5 bar at which these evaporator plants are operated are not, however, sufficient for 100% dewatering which would be required for the oil to be subsequently reprocessed by distillation. These evaporator plants, moreover, achieve extensive dewatering by re-circulating the sump, which produces incrustation problems, poor heat transfer and a high level of maintenance, as well as a considerable thermal load on the oil components, and even destroys these in the process.

During a meeting of the Society of Tribologists and Lubrication Engineers (STLE) on Jun. 5, 2007, a method for recovering, purifying and reusing oil and water from roller emulsions using a vacuum evaporator at 100 to 300 mbar absolute and at a temperature between 50° and 70° was presented. A residual metal content of less than 400 mg/l is to remain in the product water. The oil obtained has a residual water content of less than 3%. A further reduction of the residual water in such a medium has up to now not been described. The separated water can potentially be reused to produce oil-in-water emulsions. Flocculation agents were proposed for separating wear debris and metal soaps from the oil concentrate. However, successful purification with flocculation agents strongly depends on the chemical composition and is comparatively cost-intensive with regard to chemical consumption and increased residual material formation.

Furthermore, dewatering of oil sludge using thin film evaporation at 145° C. and 500 mbar is known. However, this temperature and this low pressure are also not sufficient for a substantially complete dewatering to take place.

The recovery of lubricants and lubricant concentrates by distillation with high-boiling materials consisting of lubricant-containing sludge, for example oil sludge, is hampered by the partly highly viscous consistency, which is caused by wear debris, metal soaps, decomposition products, polymerised components and surface-active substances, such as polyglycols, and the high boiling state of materials and the thermal sensitivity, as well as incrustation and poor heat transfer associated with this.

SUMMARY OF THE INVENTION

The invention is therefore based on the object of providing a method for recovering a lubricant concentrate which can be reused in metal working fluids, for example consisting of used lubricants free from water or containing water. In the case of used lubricants containing water, dewatering has to be carried out to the highest degree possible. Unwanted contents, such as very finely wear debris, metal soaps, polymers and tramp oil, must be removed from the water-free or substantially dewatered lubricant concentrate.

Surprisingly, it has been discovered that this object can be achieved by short path distillation with mechanical film production in the evaporator.

A first method for recovering lubricant concentrate from a mixture containing lubricant is thus the subject-matter of the invention, in which the mixture containing lubricant and which is substantially dewatered is subjected to short path distillation at a temperature of at least 150° C. and a pressure of less than 1.5 mbar, in order to obtain an oil or lubricant concentrate which is free of very finely wear debris, metal soaps, polymers and tramp oil and which can be recycled into cooling lubricants.

The starting material for this first method is the lubricant mixture substantially dewatered for example by treatment in a thin film evaporator at a temperature of at least 100° C. and a pressure of less than 100 mbar.

A second method is also the subject-matter of the invention, in which a mixture containing lubricant is substantially dewatered and the substantially dewatered mixture is subjected to short path distillation at a temperature of at least 150° C. and a pressure of less than 1.5 mbar, in order to obtain an oil or lubricant concentrate which is free of very finely wear debris, metal soaps, polymers and tramp oil and which can be recycled into cooling lubricants.

The starting material for this second method can be the oil-containing product of a coarse separation technique which can, for example, be carried out by a separator or a centrifuge, a decanter or tricanter. The oil or lubricant content of the starting material for the second method can be 50 to 99% wt. based on the mass of the starting material.

DESCRIPTION OF THE PREFERRED EMBODIMENTS

The starting materials for the method according to the invention is used cooling lubricants. These include water-miscible, water-mixed and water-immiscible cooling lubricants. This definition comprises mineral-oil-based lubricants and synthetic-based fluid lubricants, such as alkylbenzenes, polyalphaolefins, carboxylic acid esters, polyether oils, such as polyalkylene glycols, polyglycols, aromatic polyether oils and polyisobutenes. The properties of the lubricants, such as oxidation stability, wear protection, corrosion protection, pressure stability (load carrying capacity), foam prevention, prevention of biological nucleation, wettability, emulsifying capability and detergency, can be modified by the above mentioned substances and other additives. Various amines, polyvinylpyrrolidones, aryl/alkylsulphonates, phosphoric acid esters, non-ionic surfactants (usually ethoxylates), antioxidants and biocides can be contained in these fluids for this purpose.

Consequently, all lubricants or lubricant concentrates which accumulate as waste products during metal working are suitable for the treatment according to the invention.

Through their use, the compositions contain very finely wear debris and metal soaps as well as decomposition products, polymers and tramp oils as impurities which potentially contribute to a highly viscous consistency. These impurities adversely affect recycling and up to now have not been able to be satisfactorily separated. Very finely wear debris in terms of the invention are metal particles with a particle size of 0.1 to 200 µm or metal cuttings which are even larger, which accumulate during metal working. The very finely wear debris cannot generally be removed from the oil mixture either by coarse separation methods or by thin film evaporation already used up to now for dewatering.

Before the treatment according to the invention, the used cooling lubricant, i.e. previously known used emulsions and sludge containing lubricant, can, however, be subjected to pre-treatment for coarse separation of water and lubricants and solid particles. This can take place by means of a centrifuge, decanter and/or tricanter. For example, the used emulsions and sludge containing lubricant can firstly be coarsely separated into lubricants, water and solid particulate material using a centrifuge, decanter and/or a tricanter. A concentrated lubricant concentrate and water-containing mixture is obtained, in which the lubricant proportion can be 50 to 99.9% wt. based on the mass of this mixture. This method is also known.

Relatively low water contents can also be obtained from such compositions, which potentially form highly viscous residues, by means of evaporator plants which are equipped with mechanical film distributor systems, such as wipers, rolls or rollers. Such film evaporators with mechanical film production, for example by rotating mechanical systems, are particularly preferred according to the invention for obtaining a substantially dewatered oil mixture. The recovered water can be reused for emulsion production. Thus, for example, thin film evaporators and short path evaporators are suitable for the dewatering.

The concentrated mixture containing oil and water can be subjected to treatment at a temperature of at least 110° C., for instance 120 to 170° C., and a vacuum of less than 1 bar, preferably less than 200 mbar, for instance 20 to 150 mbar, to remove residual water in the thin film evaporator. The person skilled in the art will set pressure and temperature depending on the composition of the starting material and the type of thin film evaporator used. If short path distillation is to be used for the dewatering, this takes place under similar temperature and pressure conditions as before for thin film distillation.

With continuous thin film distillation, the feed product can be conveyed to the cylindrical evaporator from above and drains off on the heated outer wall (heating jacket). The concentrated lubricant collects in the lower area and is discharged from there. Fundamentally, mechanical film formation is required for the distillation, for example by means of a rotating wiper system with wipers, rolls or rollers which continually produces new surfaces in the highly viscous film of the feed product on the heated wall of the distillation vessel and allows a rapid phase separation to take place, as well as prevents adhesion and incrustation, so that with the given short holding time an optimum dewatering result can be achieved.

The lubricant concentrate thereby obtained is substantially free from water. This means that the proportion of water is less than 1%, preferably less than 0.5%, particularly preferably less than 0.3%. It is potentially highly viscous. It still contains very finely wear debris, metal soaps, polymers and tramp oil. Thus, through treatment in the thin film evaporator, only a substantially dewatered lubricant concentrate is obtained. The other constituents obstructing unrestricted reuse of the lubricant concentrate are not removed to a sufficient extent.

Alternatively, instead of thin film evaporation, the starting material can be treated by centrifugation in such a way that the oil concentrate obtained is substantially free from water. In bench-scale, for example, this can take place by 3 to 10 minute centrifugation at approximately 3,000 G at a temperature of 60 to 95° C. The residual water proportion in the non-aqueous phase can be 0.5 to 0.2% wt. based on the weight of the non-aqueous phase. Thus, also only a substantially dewatered lubricant concentrate is thereby obtained. The other constituents obstructing unrestricted reuse of the lubricant concentrate are not removed to a sufficient extent by centrifugation.

To recover the constituents which can be reused for metal treatment fluids, short path distillation is proposed according to the invention. Short path distillation apparatuses are cylindrical evaporators having an inner condenser. The feed product is conveyed to the cylindrical evaporator from above and drains off on the heated outer wall (heating jacket). The concentrated lubricant collects in the lower area and is discharged from there. Film formation takes place mechanically. Mechanical film formation can take place by means of wipers, rolls or rollers. In this way, a new film is continually produced and the vapour layer between film and hot surface is in each case destroyed. Short path distillation used according to the invention takes place at a temperature of at least 150° C. and a pressure of less than 1.5 mbar. Preferably, the pressure or the vacuum is at 0.001 to 0.9 mbar. Particularly preferably, the vacuum can be in the range from 0.02 to 0.1 mbar.

This allows suitable substances to be recovered from water-free, partly highly viscous, solid-containing lubricant concentrate, for example for producing lubricant emulsions or for use in lubricant emulsions.

Surprisingly, this technique has proved advantageous because metal soaps are completely and very finely wear debris and tramp oil are almost completely separated from a highly viscous lubricant concentrate by short path distillation, i.e. they remain in the residue of the distillation.

Lubricant concentrates can contain polyalkylene glycols (PAGs), for example as viscosity improvers or non-ionic surfactants (ethoxylates). PAGs and ethoxylates are distributed according to their solubility in the water phase and the oil phase. They can consequently also be present in the oil sludge. PAGs and ethoxylates are thermally decomposed as a function of temperature and corresponding time and thereby lose their effect. The decomposition begins at 150° C. and can be accelerated with increasing temperature. For the typical proportions of these additives, from approximately 290° C. the short contact time with the heating jacket of thin film or short path distillation is sufficient to significantly switch off their effect.

This is also an opportunity to eliminate residues of non-ionic emulsifiers, so that the oil concentrate can be modified for reuse according to procedure (in a controlled manner) without disruptive uncontrolled residues of emulsifiers or other non-ionic surfactants. In addition, the thermal decomposition of PAGs, which can significantly increase the viscosity of oil sludge, can be added upstream of the mechanical coarse separation of lubricant phase, water phase and wear debris, in order to achieve a better separation result during the mechanical pre-separation of oil concentrate.

Preferably, the distillate is accordingly also free of the non-ionic surfactants containing polyalkylene glycol often used in cooling lubricants, such as polyalkylene fatty alcohol ethers and polyalkylene glycol fatty acid esters.

Mineral oil, fatty acids and lubricant esters are recovered by means of the method according to the invention. These can be formulated in distilled form to cooling lubricants by adding the usual additives. The fact that the surfactants containing polyalkylene glycol have been completely separated by distillation benefits the new formulation.

The method according to the invention is particularly suitable for large metal working plants in the steel, copper or aluminium industries or mechanical engineering works, in which lubricants are used on a large scale for cutting and non-cutting of materials. Such plants have defined cooling lubricants. These cooling lubricants can be treated by means of the method according to the invention and completed for reuse and can hence be exploited in a cycle which saves on resources.

The following examples are used to explain the invention in more detail.

EXAMPLES

The examples do not describe a continuous process from coarse separation to recovery of the materials by short path distillation. Examples 1 and 3 were carried out using aqueous oil sludge without prior coarse separation. The product in Example 2 was not subjected to further distillation.

Example 1

For the dewatering and distillation tests, an aqueous oil sludge from an emulsion was used, which floated in the skim tank and was removed with a flight skimmer. The oil sludge contained approximately 30% water and 70% oil concentrate consisting of mineral oil and oil-soluble additives. The used oil concentrate consisted of mineral oil with a boiling range from 275° C. to 450° C. at normal pressure, organic amines, fatty acids, phosphoric acid esters, fatty acid esters, ethoxylated fatty alcohols and metal soaps and tramp oil proportions, which have a boiling range up to over 500° C. at normal pressure.

The oil sludge could be completely dewatered using thin film distillation at approximately 140° C. and 30 mbar. The organic amines and a small part of the more volatile mineral oil proportions were evaporated with the water.

With short path distillation of the substantially dewatered oil concentrate, the mineral oil, fatty acids and phosphoric acid esters could be recovered at a temperature of 170° C. and 0.03 mbar.

Example 2

Coarse Separation by Centrifugation

Floating oil sludge was pumped out using a suction device from a tank with a used oil emulsion from metal working, which essentially, besides water, contained mineral oil with a boiling range from 275° C. to 450° C. at normal pressure, organic amines, fatty acids, phosphoric acid esters, fatty acid esters, ethoxylated fatty alcohols and metal soaps and tramp oil proportions, which have a boiling range up to over 500° C. at normal pressure. The oil sludge was split into its coarse constituent parts by centrifugation. The proportion of wear debris and metal soaps typically corresponded to the data in Table III. Centrifugation was carried out in a laboratory centrifuge for 5 minutes at 3,000 G and at a temperature of 80° C. The oil phase, impurified with water, constituted 83% vol. with a water content of 0.3% wt. The water phase constituted 16% vol. and the solid phase 0.3% vol. Finally, between oil phase and water phase there was another intermediate layer containing both constituent parts and solid particulate material. Metal soaps could be detected in the intermediate layer and in the oil phase.

Example 3

Oil sludge was removed from a skim tank in an emulsion cycle from aluminium processing and firstly subjected to short path distillation for dewatering. The condenser surface of the laboratory short path distillation apparatus was 4 dm$^2$. The inner condenser was cooled with water from the mains and a cooling trap was cooled with liquid nitrogen.

After dewatering, the dewatered residue was used as the feed product for a further short path distillation. Cooling was carried out as previously described for the dewatering. In the process, varying temperatures from 190 to 300° C. were set. Conditions and analysis values are shown in Table I below.

TABLE I

| Test No. | | 1 | 2 | 3 | 4 | 5 | 6 | 7 | 8 | 9 |
|---|---|---|---|---|---|---|---|---|---|---|
| Feed product | | Dewatering Raw | Residue 1 | Residue 1 | Residue 1 | Residue 1 | Residue 1 | Residue 1 | Residue 1 | Residue 1 |
| Proportioning vessel | °C. | 60 | 60 | | | | | | | |
| Evaporator jacket | °C. | 140 | 160 | 180 | 200 | 220 | 240 | 260 | 280 | 300 |
| Product-> Evaporator | °C. | 90 | 90 | 90 | 90 | 90 | 90 | 90 | 90 | 90 |
| Sump drain | °C. | 80 | 80 | 90 | 100 | 120 | 130 | 150 | 150 | 150 |
| Inner condenser | °C. | SP | SP | SP | SP | SP | SP | SP | SP | SP |
| Cooling trap | °C. | N2 | N2 | N2 | N2 | N2 | N2 | N2 | N2 | N2 |
| Pressure | mbar | 30 | 0.028 | 0.035 | 0.038 | 0.05 | 0.06 | 0.065 | 0.074 | 0.082 |
| Wiper rotational speed | l/min | 400 | 400 | 400 | 400 | 400 | 400 | 400 | 400 | 400 |
| Throughput | g/h | 574.3 | 415.3 | 404.7 | 419.5 | 403.5 | 402.5 | 403.0 | 414.5 | 407.0 |
| Mass balance | | | | | | | | | | |
| Residue | % | 74.3 | 33.4 | 25.2 | 24.8 | 17.8 | 16.6 | 15.3 | 14.6 | 14.3 |
| Distillate | % | 23.1 | 66.6 | 74.8 | 75.2 | 82.2 | 83.4 | 84.7 | 85.4 | 85.7 |

The comparison of distillate and corresponding residue, illustrated in Table II below, relates to the assays in Table I and shows that with increasing temperature fatty acids and phosphoric acid esters from a temperature of 200° C. to a large extent pass into the distillate and are thus recovered. In contrast, the unwanted metal soaps are concentrated in the residue. The ester content present in the feed product, consisting of synthetic alcohol and fatty acid, is relatively low (5%). These esters are only slightly distilled up to 300° C. Even higher temperatures are required for these ester types.

TABLE II

| "VTA" assay | Kinematic viscosity 40° C., mm2/s | Hydrocarbons C—H3 / C—H2 Ext | Hydrocarbons CH2/CH3 Ext | Hydrocarbons R—C=C—R Ext | Hydrocarbons R—C=C—R Ext % | Esters R—COO—R Ext | Esters R—COO—R Ext % | Acids R—COO—H Ext | Acids R—COO—H Ext % | Metal soaps R—COO—M (m) Ext | Metal soaps R—COO—M (m) Ext % | Metal soaps R—COO—M (d/p) Ext. | Metal soaps R—COO—M (d/p) Ext % | P-Esters P/O Ext | P-Esters P/O Ext % |
|---|---|---|---|---|---|---|---|---|---|---|---|---|---|---|---|
| Distillate 02, 160° C. | 20.8 | 0.352 / 0.640 | 3.03 | 0.015 | 1.51 | 0.020 | 2.0 | 0.046 | 4.6 | <0.02 | <2 | <0.02 | <2 | 0.047 | 4.7 |
| Distillate 03, 180° C. | 22.3 | 0.351 / 0.646 | 3.06 | 0.017 | 1.71 | 0.020 | 2.0 | 0.052 | 5.2 | <0.02 | <2 | <0.02 | <2 | 0.052 | 5.2 |
| Distillate 04, 200° C. | 23.3 | 0.346 / 0.647 | 3.11 | 0.017 | 1.71 | 0.021 | 2.1 | 0.055 | 5.5 | <0.02 | <2 | <0.02 | <2 | 0.048 | 4.8 |
| Distillate 05, 220° C. | 24.1 | 0.337 / 0.634 | 3.13 | 0.017 | 1.75 | 0.021 | 2.2 | 0.057 | 5.9 | <0.02 | <2 | <0.02 | <2 | 0.044 | 4.5 |
| Distillate 06, 240° C. | 25.0 | 0.340 / 0.647 | 3.16 | 0.017 | 1.72 | 0.022 | 2.2 | 0.064 | 6.5 | <0.02 | <2 | <0.02 | <2 | 0.045 | 4.6 |
| Distillate 07, 260° C. | 25.6 | 0.328 / 0.627 | 3.17 | 0.019 | 1.99 | 0.022 | 2.3 | 0.066 | 6.9 | <0.02 | <2 | <0.02 | <2 | 0.039 | 4.1 |
| Distillate 08, 280° C. | 27.1 | 0.329 / 0.637 | 3.21 | 0.019 | 1.97 | 0.023 | 2.4 | 0.075 | 7.8 | <0.02 | <2 | <0.02 | <2 | 0.040 | 4.2 |
| Distillate 09, 300° C. | 27.5 | 0.334 / 0.653 | 3.24 | 0.017 | 1.72 | 0.025 | 2.5 | 0.083 | 8.4 | <0.02 | <2 | <0.02 | <2 | 0.040 | 4.1 |

| "VTA" assay | Hydrocarbons C—H3 Ext | Hydrocarbons C—H2 Ext | Hydrocarbons CH2/CH3 | Hydrocarbons R—C=C—R Ext | Hydrocarbons R—C=C—R Ext % | Esters R—COO—R Ext | Esters R—COO—R Ext % | Acids R—COO—H Ext | Acids R—COO—H Ext % | Metal soaps R—COO—M (m) Ext | Metal soaps R—COO—M (m) Ext % | Metal soaps R—COO—M (d/p) Ext. | Metal soaps R—COO—M (d/p) Ext % | P-Esters P/O Ext | P-Esters P/O Ext % |
|---|---|---|---|---|---|---|---|---|---|---|---|---|---|---|---|
| Residue 01, 140° C. | 0.322 | 0.660 | 3.4 | 0.021 | 2.14 | 0.024 | 2.4 | 0.025 | 2.5 | 0.034 | 3.5 | 0.050 | 5.1 | 0.037 | 3.8 |
| Residue 02, 160° C. | 0.288 | 0.682 | 4.0 | 0.027 | 2.78 | 0.045 | 4.6 | 0.010 | 1.0 | 0.059 | 6.1 | 0.098 | 10.1 | 0.031 | 3.2 |
| Residue 03, 180° C. | 0.272 | 0.684 | 4.3 | 0.030 | 3.14 | 0.052 | 5.4 | 0.005 | 0.5 | 0.070 | 7.3 | 0.115 | 12.0 | 0.023 | 2.4 |
| Residue 04, 200° C. | 0.262 | 0.694 | 4.7 | 0.033 | 3.45 | 0.064 | 6.7 | 0.003 | 0.3 | 0.069 | 7.2 | 0.124 | 13.0 | 0.013 | 1.4 |
| Residue 05, 220° C. | 0.226 | 0.676 | 5.5 | 0.035 | 3.88 | 0.088 | 9.8 | 0.005 | 0.6 | 0.077 | 8.5 | 0.148 | 16.4 | 0.005 | 0.5 |
| Residue 06, 240° C. | 0.227 | 0.673 | 5.5 | 0.037 | 4.11 | 0.094 | 10.4 | 0.005 | 0.6 | 0.084 | 9.3 | 0.159 | 17.7 | | |
| Residue 09, 300° C. | 0.197 | 0.642 | 6.3 | 0.041 | 4.89 | 0.115 | 13.7 | 0.011 | 1.3 | 0.117 | 13.9 | 0.184 | 21.9 | | |

The abbreviations in the Table have the following meanings. Ext.=Extinction; Ext. %=Percentage extinction; m=monomer; d=dimer; p=polymer; P/O=phosphorus bound to oxygen; n.n=not detectable.

The measured values of the organic-chemical components in Table II were determined by FT-IR/ATR (Fourier Transformation Infrared Spectrometry/Attenuated Total Reflection). The absolute extinctions were normalised to the CH groups present in excess ($CH_2$ and $CH_3$).

Table III below details values for the wear debris and dissolved metal cations (cations of the metal soaps, salts from metal and fatty acids) and relates to the assay according to Test 1 from Table I. "Feed" means the feed stream for dewatering, "Distillate" refers to the separated water and "Residue" is what is further treated by short path distillation corresponding to Tests 2 to 9 in the Table. It is evident that metals and metal ions are not removed by dewatering by means of thin film distillation. The concentration in the residue for the purposes of analytical accuracy corresponds to the loss of water (approximately 25%).

The distillates are clear after short path distillation, i.e. free of suspended wear debris. With poor splash protection very finely wear debris and metal soaps can potentially be carried over. Table IV shows the total amount of the metals (wear debris and dissolved as metal soaps) when a cloudy distillate is obtained owing to poor splash protection. The very finely wear debris carried over and the metal soaps carried over are negligible compared to the contents in dewatered oil sludge (Table III).

Table III below indicates the wear debris and dissolved metal cations (metal soaps) before and after dewatering.

TABLE III

| Assay | mg/l Al | | mg/l Fe | | mg/l Mg | |
|---|---|---|---|---|---|---|
| | solid | dissolved | solid | dissolved | solid | dissolved |
| Test 1 Residue | 14339 | 4490 | 872 | 497 | 1258 | 683 |
| Test 1 Feed | 11349 | 3862 | 605 | 463 | 590 | 918 |
| Test 1 Distillate (water) | 4.7 | 21.2 | 0.3 | 3.2 | 0.2 | 3.6 |

The typical total amount of the metals (solid and dissolved) in the distillate after short path distillation at 300° C. with poor splash protection is shown in Table IV.

TABLE IV

| mg/l Al | mg/l Fe | mg/l Mg |
|---|---|---|
| 22 | 0.7 | 1.0 |

What is claimed is:

1. Method for recovering fluid lubricant or lubricant concentrate from a mixture, obtained as waste products during metal working containing lubricant and which has a dewatering step to reduce the water content to less than 1%, comprising subjecting the mixture containing lubricant to short path distillation at a temperature of at least 150° C. and a pressure of less than 1.5 mbar, in order to obtain a lubricant concentrate which can be recycled into cooling lubricants and which is substantially free of wear debris, metal soaps and polymers, wherein the recovery of oil concentrate from the mixture containing lubricant is carried out batch wise or continuously.

2. Method according to claim 1, wherein the dewatering is carried out by thin film distillation, short path distillation or a separation technique selected from decanter, tricanter or centrifuge.

3. Method according to claim 1, wherein the vacuum chamber of the short path distillation for evaporating the substantially dewatered lubricant-containing mixture is operated at a pressure of 0.001 to 0.1 mbar.

4. Method according to claim 3, wherein the vacuum chamber of the short path distillation for evaporating the substantially dewatered lubricant-containing mixture is operated at a pressure of 0.01 to 0.1 mbar.

5. Method according to claim 2, wherein the evaporation surface of the short path distillation for evaporating the substantially dewatered oil-containing mixture is operated at a temperature of 150° C. to 350° C.

6. Method according to claim 1, wherein thin film distillation or short path distillation is carried out at a temperature of 120° C. to 170° C. to dewater the mixture containing lubricant by distillation.

7. Method according to claim 1, wherein the recovery of oil concentrate from the mixture containing lubricant is carried out batchwise or continuously.

8. Method according to claim 1, wherein the recovery of oil concentrate from the mixture containing lubricant is carried out continuously.

* * * * *

UNITED STATES PATENT AND TRADEMARK OFFICE
CERTIFICATE OF CORRECTION

PATENT NO.         : 8,642,518 B2
APPLICATION NO.    : 13/131352
DATED              : February 4, 2014
INVENTOR(S)        : Oliver Seiferth et al.

It is certified that error appears in the above-identified patent and that said Letters Patent is hereby corrected as shown below:

In the Claims

In column 12, lines 24-25, claim 3, delete the word "chamber".

In column 12, lines 28-29, claim 4, delete the word "chamber".

In column 12, line 42, claim 7, delete the words "or continuously.".

Signed and Sealed this
Fourteenth Day of July, 2015

Michelle K. Lee
*Director of the United States Patent and Trademark Office*